(12) United States Patent
Gramling

(10) Patent No.: US 11,750,685 B2
(45) Date of Patent: *Sep. 5, 2023

(54) MEDIA CONTENT DISTRIBUTION PLATFORM

(71) Applicant: Ideology Health LLC, Austin, TX (US)

(72) Inventor: Michael Thomas Gramling, Austin, TX (US)

(73) Assignee: Ideology Health LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/880,244

(22) Filed: Aug. 3, 2022

(65) Prior Publication Data
US 2023/0188593 A1 Jun. 15, 2023

Related U.S. Application Data

(63) Continuation of application No. 17/643,472, filed on Dec. 9, 2021, now Pat. No. 11,445,006.

(51) Int. Cl.
| | |
|---|---|
| *G06F 15/16* | (2006.01) |
| *H04L 67/02* | (2022.01) |
| *H04L 51/08* | (2022.01) |
| *H04L 67/55* | (2022.01) |
| *H04L 51/046* | (2022.01) |
| *H04L 67/306* | (2022.01) |

(52) U.S. Cl.
CPC ............ *H04L 67/02* (2013.01); *H04L 51/046* (2013.01); *H04L 51/08* (2013.01); *H04L 67/306* (2013.01); *H04L 67/55* (2022.05)

(58) Field of Classification Search
CPC ....... H04L 67/02; H04L 67/55; H04L 51/046; H04L 51/08; H04L 67/306

USPC ......................................................... 709/203
See application file for complete search history.

(56) References Cited

U.S. PATENT DOCUMENTS 11,445,006 B1 * 9/2022 Gramling ................ H04L 67/02
2004/0148356 A1 7/2004 Bishop, Jr. et al.
(Continued)

FOREIGN PATENT DOCUMENTS

WO WO2008072093 A2 6/2008

OTHER PUBLICATIONS

Office Action for U.S. Appl. No. 17/643,472, dated Feb. 14, 2022, Gramling, "Media Content Distribution Platform", 13 pages.
(Continued)

*Primary Examiner* — Alan S Chou
(74) *Attorney, Agent, or Firm* — Lee & Hayes, P.C.

(57) ABSTRACT

A system can select media content instances for users, based on media preferences associated with the users and priority ratings of the media content instances. When the system selects a media content instance for a user, the system can send a text message or other notification to a user device of the user. The notification can include a media link to the selected media content instance. The system can also receive user feedback on the relevance and/or usefulness of the media content instances, which the system can use to adjust the priority ratings of the media content instances over time. The system can additionally determine whether consumption of media content instances by users leads to changes in behavior of the users over time.

20 Claims, 5 Drawing Sheets

(56) References Cited

U.S. PATENT DOCUMENTS

| | | |
|---|---|---|
| 2008/0201225 A1 | 8/2008 | Maharajh et al. |
| 2012/0270527 A1 | 10/2012 | Smith et al. |
| 2016/0037311 A1 | 2/2016 | Cho |
| 2016/0092576 A1 | 3/2016 | Quercia et al. |
| 2016/0343037 A1 | 11/2016 | Nicholas et al. |
| 2017/0048184 A1 | 2/2017 | Lewis et al. |
| 2018/0232641 A1* | 8/2018 | Bostick .................... G06N 5/04 |
| 2020/0036783 A1 | 1/2020 | Bourassa et al. |
| 2021/0241155 A1 | 8/2021 | Kardan et al. |

OTHER PUBLICATIONS

Extended European Search Report dated May 8, 2023 for European Patent Application No. 22194420.0, 7 pages.

* cited by examiner

200

| 104 | Media Content Identifiers 116 | Media Categories 118 | Priority Ratings 122 |
|---|---|---|---|
| 104A | Lung Cancer Treatment Update (11/22/21) | Cancer; Lung Cancer; Treatment Updates | 9.5 |
| 104B | Oncology Society Meeting Summary (11/08/21) | Cancer; Oncology Society Meeting Information | 9.4 |
| 104C | Pharmaceutical Trial 12A5925B Results (10/15/21) | Cancer; Breast Cancer; Trial Results | 9.1 |
| ... | ... | ... | ... |

MEDIA CONTENT DISTRIBUTION PLATFORM

CROSS-REFERENCE TO RELATED APPLICATION

This application is a continuation of and claims priority to U.S. application Ser. No. 17/643,472, filed on Dec. 9, 2021 and entitled "MEDIA CONTENT DISTRIBUTION PLATFORM," the entirety of which is incorporated herein by reference.

BACKGROUND

Individuals can benefit from learning new information. For example, doctors may want to stay apprised of new advancements in the medical field, to understand options that may be available when treating patients. Other types of users can similarly benefit from learning other types of information conveyed through training material, educational material, or other types of material.

Media content can be created to convey informational, training, or educational material to users. As an example, content creators can create videos for doctors and other medical professionals that explain medical advancements, pharmaceutical trial results, or other information. Accordingly, medical professionals can stay informed about new information relevant to the medical field in part by watching the videos. Other types of users, such as patients, students, and employees, can similarly benefit from consuming media content, such as training or educational videos.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
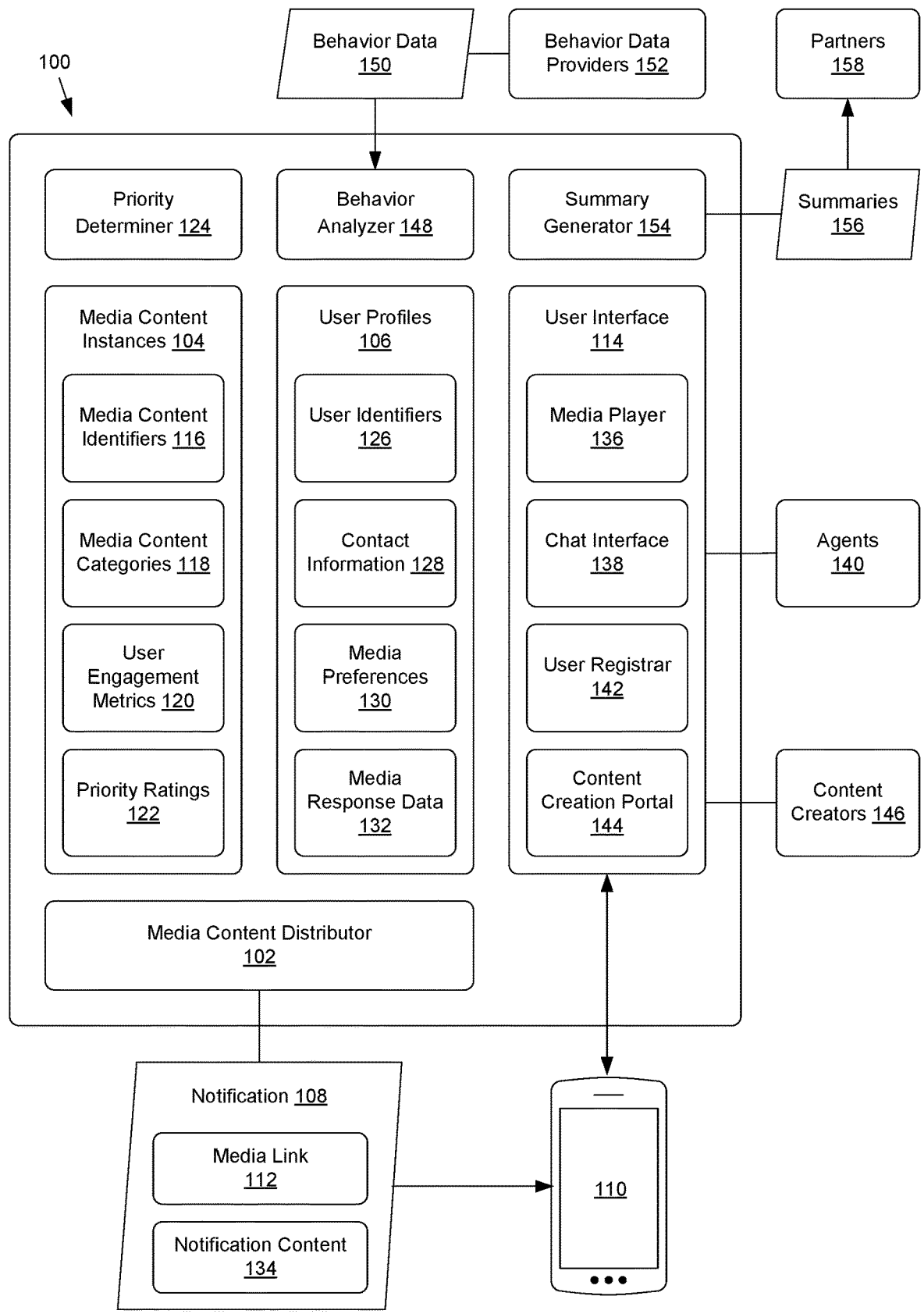
FIG. 1 shows an example system configured to distribute media content to user devices.

Individuals can benefit, personally and/or professionally, from learning new information. For example, doctors and other medical professionals may desire to stay informed about new therapeutic treatments, new pharmaceutical drugs, new vaccines, new medical devices, new guidelines, and other types of advancements or information associated with the medical field. Other types of users may similarly want to learn about various topics.

However, it can be difficult or time-consuming for individuals to access and consume new information. In some examples, information can be conveyed to individuals by others in in-person and/or real-time settings, such as conferences or meetings. However, travel and scheduling concerns may prevent many individuals from learning new information in such in-person and/or real-time settings. For example, busy medical professionals may not have time to attend medical conferences, meet with pharmaceutical representatives, or otherwise learn about new medical advancements from others in in-person and/or real-time settings.

As an alternative to physically attending a conferences or meeting with others in in-person and/or real-time settings, users may learn information in part by consuming media content that conveys the information. For example, doctors can stay informed about advancements in medical treatments in part by watching videos that summarize or explain those advancements.

However, conventional methods of locating, accessing, and consuming relevant media content may be time-consuming and/or frustrating for users. For example, a user who wants to learn about a particular topic may use an Internet search engine, or search a video website or service such as conventional video sharing services (e.g., YouTube® and the like), in an attempt to find a video that may discuss that particular topic. In many cases, such manual searches may not lead to media content that is of interest to the user, or may lead to media content that does not convey the information the user was looking for. In some examples, users also may not be aware that media content exists that may be of interest to the users, even if the users could find that media content via manual searches. In other examples, even if users may be able to find media content that may be relevant to the users, the duration of the media content may be too long for users to consume. For example, a doctor with a busy schedule may be unlikely to find time to watch a thirty-minute video about a topic.

The system described herein can provide users with notifications about media content that, based on user preferences, may be of interest to the individual users. For example, if a doctor is interested in videos about cancer treatments, the system can periodically transmit text messages to the doctor's mobile phone that include links to short videos about cancer treatments. When the doctor has time to view such videos, the doctor can access the videos on the mobile phone by selecting the links in the text messages. Accordingly, the system can proactively notify users about relevant media content the users might not otherwise be aware of, and can allow the users to access the media content at times selected by the users.

FIG. 1 shows an example system 100 configured to distribute media content to user devices. The system 100 can include a media content distributor 102 configured to select media content instances 104 for registered users of the system 100, based on information associated with the media content instances 104 and user profiles 106 associated with the registered users. The media content distributor 102 can transmit notifications, such as text messages, associated with the selected media content instances 104 to user devices of the users. For example, FIG. 1 shows the media content distributor 102 transmitting a notification 108 to a user device 110 of a user. The notification 108 can include a user-selectable media link 112 associated with a media content instance. When users interact with the notifications via user devices, for instance by selecting media links or viewing embedded content in the notifications, the user devices can load the corresponding media content instances 104 via a user interface 114 of the system 100. For example, the user interface 114 can be a website that presents the media content instances 104, such that the users can view, listen to, and/or otherwise consume the media content instances 104 via the website.

In some examples, the notification 108 can be a text message, such as a Short Message Service (SMS) message, a Multimedia Messaging Service (MIMS) message, a Rich Communication Services (RCS) message, an Apple® iMessage® message, or other type of text message. In other examples, the notification 108 can be a message sent via a third-party messaging platform or application, an email, or any other type of message.

In some examples, user devices that can receive notifications from the system 100, and can load the user interface 114, can be smartphones or other types of mobile phones. For example, the user device 110 shown in FIG. 1 can be a smartphone, which can receive the notification 108 as an SMS message or other type of text message, and can load the user interface 114 as a website via a web browser executing on the smartphone. In other examples, a user device can be a personal digital assistant (PDA), a tablet computer, a smart watch, a personal computer (PC) such as a laptop, desktop, or workstation, or any other type of computing or communication device that can receive notifications from the system 100 and can load and display the user interface 114 of the system 100.

The media content instances 104 can include video, audio, slideshow presentations, interactive content, and/or other types of media content. As a non-limiting example, a particular media content instance can be a video showing a doctor, researcher, or other expert discussing treatment options and/or other information associated with a specific disease state. The system 100 can have a file system, database, or other repository that stores media files and other data associated with the media content instances 104. The media content instances 104 can be associated with corresponding media content identifiers 116, such as titles, dates, file names, identification numbers, and/or other types of data that uniquely identify the media content instances 104.

In some examples, the media content instances 104 can have relatively short durations, such as two minutes or less. However, in other examples, the media content instances 104 can have longer durations. Some media content instances 104 can also be short-form versions of longer media content instances 104. As a non-limiting example, a particular media content instance can be a sixty-second video about a topic. The particular media content instance can be associated with a longer video about the same topic that has a longer duration, such as five minutes, eight minutes, or any other longer duration. In some examples, the system 100 can be configured to send notifications of short-form media content instances 104 to user devices as described herein. If users access the short-form media content instances 104 in the user interface 114 via the notifications, the user interface 114 can provide links that allow the users to optionally access longer versions of those short-form media content instances 104.

Figure 2:
FIG. 2 shows an example of data stored in the system in association with media content instances.

The media content instances 104 can also be associated with media content categories 118. In some examples, individual media content instances 104 can be associated with tags or other metadata in the system 100 to indicate one or more media content categories 118 associated with the individual media content instances 104. A non-limiting example of media content categories 118 associated with media content instances 104 is shown in FIG. 2, and is discussed below with respect to that figure.

The media content categories 118 can indicate topics associated with the media content instances 104, individuals or entities that created the media content instances 104, other groups or entities associated with the media content instances 104, and/or other types of groupings or categories.

As an example, media content instances 104 associated with medical information can be associated with media content categories 118 for types of diseases, types of treatments, pharmaceutical trial results, medical practice tips, practice groups, hospital systems, meeting summaries, and/or other types of categories. As another example, media content instances 104 can be associated with media content categories 118 for different types of educational content, training content, entertainment content, news content, sports content, and/or other types of content.

In some examples, the media content instances 104 can be associated with user engagement metrics 120. The user engagement metrics 120 associated with a particular media content instance can track how many times the media content instance has been viewed overall and/or during certain periods of time. The user engagement metrics 120 can also indicate how much of a media content instance is viewed on average. For example, the user engagement metrics 120 may indicate that, on average, users view seventy seconds of a ninety-second video. The user engagement metrics 120 can also indicate a number of unique users who have accessed individual media content instances 104, historical trends of popularities of media content instances 104 over time, user ratings of media content instances 104, and/or any other user engagement metric associated with media content instances 104.

The media content instances 104 can also be associated with priority ratings 122. The priority ratings 122 can indicate relative distribution priorities of the media content instances 104 overall, and/or within media content categories 118. In some examples, the priority ratings 122 can be indicated on a scale of values, such as a scale from 1 to 10, 1 to 100, 1 to 1000, or any other scale. In other example, the priority ratings 122 can be indicated by any other type of data, such as rankings, priority levels, priority tiers, and/or other data.

As described further below, the media content distributor 102 can select media content instances 104 for users based on the priority ratings 122 of the media content instances 104, and based on information in the user profiles 106. For example, if a user has not yet been notified about two media content instances 104 that a corresponding user profile indicates may be of interest to the user, and one of the two media content instances 104 has a higher priority rating than the other media content instance, the media content distributor 102 can be configured to select the media content instance with the higher priority rating for the user.

In some examples, the system 100 can automatically and/or dynamically change the priority ratings 122 associated with media content instances 104 over time. For example, the system 100 can include a priority determiner 124 configured to determine and/or change priority ratings 122 associated with the media content instances 104 based on ages of the media content instances 104, the user engagement metrics 120 associated with the media content instances 104, and/or other factors. For example, when a new media content instance is added to the system 100, the priority determiner 124 can initially assign a relatively high priority rating, or a default priority rating, to the new media content instance. However, the priority determiner 124 can change the priority rating of the media content instance over time. For example, the priority determiner 124 can be configured to lower the priority rating of the media content instance over time as the age of the media content instance increases, unless user engagement metrics 120 indicate that the media content instance remains popular among users.

The user profiles 106 can include information associated with registered users of the system 100. The user profiles 106 can indicate, for example, user identifiers 126, contact information 128, media preferences 130, and/or media response data 132 associated with registered users.

The user identifiers 126 can include names, numbers, and/or other identifying data uniquely associated with individual users. In some examples in which the registered users include physicians or other healthcare providers, the user identifiers 126 can include the National Provider Identifiers (NPIs) of the healthcare providers.

The contact information 128 can include telephone numbers, email addresses, and/or other contact information associated with registered users. The contact information 128 can include information the media content distributor 102 can use to transmit notifications to user devices of the users. For example, the contact information 128 for a user associated with the user device 110 shown in FIG. 1 can include a telephone number associated with the user device 110, such that the media content distributor 102 can send the notification 108 as an SMS message or other type of text message addressed to the telephone number of the user device 110. As another example, the contact information 128 can include an email address of the user, a username associated with the user on a third-party messaging service, or another type of address or identifier through which the user device 110 can receive the notification 108 from the system 100.

The media preferences 130 can indicate types of media content instances 104 of interest to registered users. For example, when a user registers with the system 100 and/or after the user registers with the system 100, the user can select one or more types of media content categories 118 that are of interest to the user. The media content categories 118 selected by the user can accordingly be indicated in the media preferences 130 of the user profile associated with the user.

As described further below, the media content distributor 102 can select media content instances 104 for users based in part on the media preferences 130 indicated in the user profiles 106. For example, if media preferences 130 associated with a particular user indicates that the user is interested in media content in a cancer treatment category, and the system 100 has a media content instance within the cancer treatment category that the user has not yet been notified about, the media content distributor 102 can select that media content instance for the user based on the media preferences 130. The media content distributor 102 can accordingly transmit, to a user device of the user, a notification that includes a media link to the selected media content instance.

The media content distributor 102 can also select media content instances 104 for users based on priority ratings 122 of the media content instances 104. Accordingly, in the example discussed above, if the system 100 has multiple media content instances 104 within the user-preferred cancer treatment category that the user has not yet been notified about, the media content distributor 102 can select one of those media content instances 104 for the user based on the priority ratings 122 of those media content instances 104. The system 100 can send a notification about the selected media content instance to the user device of the user. At a later time, the system 100 can select a different media content instance in the user-preferred cancer treatment category, or a different user-preferred media content category, and can send a new notification about the selected media content instance to the user device of the user.

The user profiles 106 can also indicate media response data 132 associated with users. The media response data 132 for a user can indicate which media content instances 104 the user has been notified about, when corresponding notifications were sent to the user device of the user, whether the user accessed media content instances 104 in response to the corresponding notifications, how much of the accessed media content instances 104 the user consumed, how often the user responds to notifications by accessing corresponding media content instances 104, times of day that the user has responded to notifications, durations between times at which notifications are sent and when the user responds to the notifications, user ratings of media content instances 104 provided by the user, survey responses provided the user in association with media content instances 104, and/or any other data indicating how or whether the user has responded to notifications and/or has interacted with media content instances 104.

Figure 3:
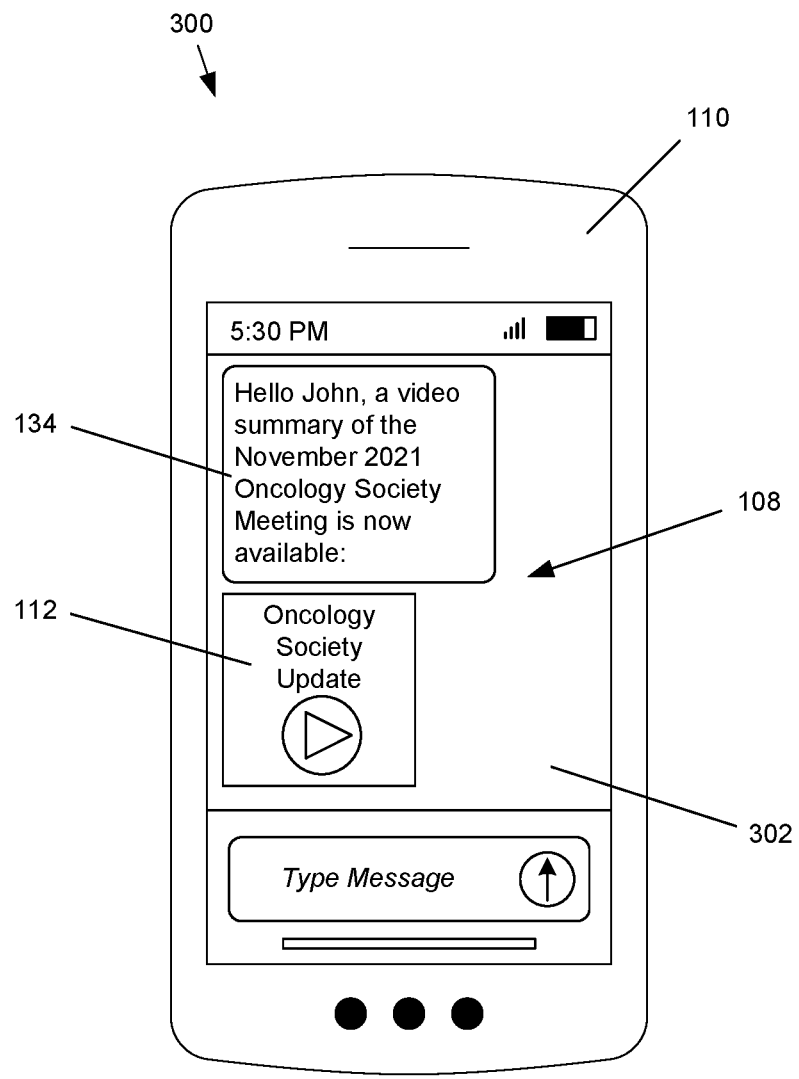
FIG. 3 shows an example of a notification sent by the system to a user device.

As discussed above, the media content distributor 102 can select a media content instance for a user from a repository of media content instances 104 based on the media preferences 130 of the user and the priority ratings 122 of the media content instances 104. The media content distributor 102 can cause the system 100 to transmit the notification 108 to the user device 110 of the user, for example using a telephone number or other information associated with the user device 110 indicated by the contact information 128 of the corresponding user profile. The notification 108 can include the media link 112 associated with the selected media content instance. In some examples, the media link 112 can be a hyperlinked thumbnail image that represents the selected media content instance, a text link, or another type of user-selectable link. The notification 108 can also include notification content 134, such as text description of the media content instance and/or a message suggesting that the user select the media link 112 to access the media content instance. A non-limiting example of the notification 108 is shown in FIG. 3, and is discussed below with respect to that figure.

As discussed above, in some examples the notification 108 can be an SMS message or other type of text message. Accordingly, the user device 110 can display the notification 108, including the media link 112 and the notification content 134, via a default or user-selected messaging application that executes on the user device 110. The user can accordingly view the notification 108 via the messaging application on the user device 110. If the user selects the media link 112, the user device 110 can load the user interface 114 of the system 100 via a web browser or other application that executes on the user device 110. The user interface 114 can have a media player 136 that can play, or otherwise present or display, the media content instance associated with the media link 112 via the user interface 114.

In other examples, the notification 108 can be sent to an application associated with the system 100, such as a mobile application, that is installed on the user device 110. The application can execute locally on the user device 110 to receive and display the notification 108. In these examples, a user selection of the media link 112 can prompt the application to load a local version of the user interface 114, or cause the user device 110 to load the user interface 114 via a web browser or other application, such that the user can consume the media content instance associated with the media link 112 via the user interface 114.

Over time, the media content distributor 102 can select multiple media content instances 104 for a particular user, based on the media preferences 130 of the user and priority ratings 122 of the media content instances 104, and can cause the system 100 to transmit notifications of the selected media content instances 104 to the user device of the user. The user can select media links in the notifications to access the corresponding media content instances 104 in the user interface 114.

When the media content distributor 102 selects a media content instance for a user and causes the system 100 to transmit a corresponding notification to a user device of the user, the media content distributor 102 can store an indication that the system 100 has notified the user about the selected media content instance. For example, the media content distributor 102 can store such indications in the media response data 132 and/or other elements of user profiles 106. Accordingly, based on such historical indications of which media content instances 104 users have already been notified about, the media content distributor 102 can determine sets of candidate media content instances 104 that users have not yet been notified about, and cause the system 100 to send subsequent notifications of media content instances 104 selected from such sets of candidate media content instances 104.

The media content distributor 102 can be configured to transmit notifications to user devices of individual users at regular or variable intervals. For example, media content distributor 102 can be configured to select a media content instance for a user, and to transmit a corresponding notification to a user device of the user, once a day, once a week, once a month, or on any other regular or irregular schedule. At a time at which the media content distributor 102 is configured to transmit a notification to a user device of a user, the media content distributor 102 can use the media preferences 130 of a user profile of the user to determine media content categories 118 that are of interest to the user. The media content distributor 102 can also identify relevant media content instances 104 that are associated with the media content categories 118 the user profile indicates are of interest to the user. The media content distributor 102 can identify a set of the relevant media content instances 104 that the system has not yet notified the user about, and can select a particular one of the relevant media content instances 104 that has the highest priority rating. The media content distributor 102 can cause the system 100 to transmit a notification to the user device of the user that includes a media link to the selected media content instance, such that the user has the option of selecting the media link to access the selected media content instance via the user interface 114.

After sending a notification associated with a selected media content instance to user device, the media content distributor 102 can wait until the next time at which a notification is to be sent to the user device. At that time, the media content distributor 102 can select another media content instance that is relevant to the user, and can cause the system 100 to transmit a notification with a media link to the newly-selected media content instance. In some cases, the newly-selected media content instance may have a lower priority rating than the last media content instance selected for the user, but may have the highest priority rating among relevant media content instances that the user has not yet been notified about. In other cases, the newly-selected media content instance may have been recently added to the system by a content creator, and may have the highest priority rating among relevant media content instances that the user has not yet been notified about based in part on the media content instance having been recently added.

In some examples, the media content distributor 102 can determine times at which to send notifications to user devices, and/or intervals between sending such notifications, based on media response data 132 in the user profiles 106. For example, if media response data 132 in a first user profile associated with a first user indicates that on average the first user selects media links in notifications within two hours of the notifications being sent, the media response data 132 can indicate that the first user is highly interested in media content instances 104 provided by the system 100. Accordingly, the media content distributor 102 can select new media content instances 104 for the first user, and cause the system 100 to send corresponding notifications, on a relatively frequent basis, such as once per day.

However, if media response data 132 in a second user profile associated with a second user indicates that the second user rarely selects media links in notifications, or that on average the second user selects media links in notifications within three days of the notifications being sent, the media response data 132 can indicate that the second user is less interested than the first user in media content instances 104 provided by the system 100. The media content distributor 102 can select new media content instances 104 for the second user, and cause the system 100 to send corresponding notifications, on a less frequent basis, such as once per week or once per month. Accordingly, in some examples or situations, the system 100 can improve efficiency and reduce usage of processor cycles, memory, bandwidth, and other computing resources by selecting media content instances 104 and sending notifications to less-interested users less frequently than for more-interested users.

As another example, media response data 132 may indicate that a particular user most often selects media links in notifications to access corresponding media content instances between 7 PM and 10 PM. Accordingly, the media content distributor 102 can determine that the system 100 should send subsequent notifications to the user device of that particular user in the evening, when the user may be more likely to respond to the notifications, rather than in the morning.

In still other examples, media preferences 130 or other information in the user profiles 106 may indicate user-preferred notification times and/or user-preferred notification schedules. For example, during or after registration with the system 100, a user can indicate how often the user would like to receive notifications, and that information can be stored in the user profile of the user. The media content distributor 102 can accordingly select media content instances 104 for the user, and cause the system to send corresponding notification, at times determined based on user-indicated preferences stored in the user profile.

When the system 100 sends a notification with a media link to a media content instance to a user device, and a user selects the media link via the notification, the user device can load the user interface 114. Accordingly, the media player 136 of the user interface 114 can play, or otherwise present or display, the media content instance. In some examples, the media player 136 can also allow a user to pause, rewind, fast forward, and/or otherwise control presentation of a media content instance.

The user interface 114 can also display text descriptions or other information associated with a media content instance, such as a summary of the media content instance, an indication of when the media content instance was created, an identifier of a creator of the media content instance, a link to a longer version of the media content instance, links to related media content instances, options to provide user ratings of the media content instance, moderator descriptions associated with the media content instance, and/or other information or links. The user interface 114 can also display options or links associated with a user profile of a user, such as options to save the media content instance as a favorite of the user, links to previously-saved favorite media content instances of the user, and/or other information or links.

In some examples, the user interface 114 can also include a chat interface 138. The chat interface 138 can be located on the same page of the user interface 114 as the media player 136 that presents a media content instance, or can be located on a different page or section of the user interface 114. The chat interface 138 can be a text chat interface, an audio chat interface, a video chat interface, or any other interface presented via the user interface 114, through which users can chat with agents 140 associated with the system 100. The agents 140 can be human or automated representatives of the system 100.

Agents 140 can interact with users of the system 100 via the chat interface 138. For example, if a user views a media content instance via the media player 136, the user can use the chat interface 138 to ask an agent questions about the media content instance. As another example, an agent can use the chat interface 138 to ask the user questions about whether the substance of the media content instance was useful or relevant to the user, present a survey or poll to the user, and/or otherwise converse with the user. For instance, if the user is a doctor and the media content instance is a video that discusses a treatment option for a particular disease, the agent may use the chat interface 138 to ask the doctor how often the doctor sees patients that have been diagnosed with that disease, how likely the doctor will be to use the treatment option discussed in the video in the future, how helpful the doctor thought the content of the video was, and/or any other questions.

In other examples, users can chat with human or automated agents 140 outside the chat interface 138 and/or the user interface 114. For example, if the notification 108 is an SMS message delivered to a messaging application executing on the user device 110, a user may use the messaging application to send a reply SMS message to the system 100. In this example, the user's reply SMS message can be provided to one of the agents 140, and the agent can chat with the user via SMS messages instead of the chat interface 138. As another example, a human or automated agent can pose survey or poll questions to the user, or otherwise exchange information with the user, via text messaging or other two-way communications outside the chat interface 138 and/or the user interface 114.

In some examples, user answers to questions posed by agents 140 via the chat interface 138 or outside the chat interface 138 can be stored as media response data 132 in corresponding user profiles 106, and/or as user engagement metrics 120 associated with the media content instances 104. The priority determiner 124 can also, in some examples, adjust priority ratings 122 of media content instances 104 based on user answers to questions posed by agents 140. For example, if an aggregated collection of user answers associated with a particular media content instance about a disease state indicate that doctors rarely see patients with that disease state, the priority determiner 124 may lower the priority rating of that particular media content instance.

The user interface 114 can, in some examples, include links or other options by which users can connect with experts through the chat interface 138 or through another interface. In some examples, the experts can be agents 140 that are representatives of the system 100, or other individuals associated with the system 100. As a non-limiting example, a page of the user interface 114 that presents, via the media player 136, a media content instance about a clinical trial associated with a treatment option can have a "Connect with an Expert" link or other similar user-selectable option. If a user accesses the media content instance about the clinical trial through the user interface 114 and selects that option, the user can be connected to an expert who is familiar with the clinical trial. In some examples, the system 100 can connect the user to the expert in real-time, for instance via text chat, audio chat, or video chat. In other examples, a scheduler of the system 100 can schedule a future meeting, call, or other interaction between the user and an expert. Such a scheduled future interaction may occur through the system 100 or outside the system 100.

The user interface 114 can include a user registrar 142 through which users can register with the system 100. For example, the user registrar 142 can be one or more web pages of a website that users can use to register and create user profiles with the system 100. The user registrar 142 can have text fields, user-selectable options, and other elements that allow a new user to provide user identifiers 126, contact information 128, media preferences 130, and/or other data associated with the new user, such that the system 100 can use the user-provided information to generate a new user profile corresponding to the new user. As discussed above, the user can provide media preferences 130 indicating which media content categories 118 are of interest to the user. In some examples, a registered user of the system 100 can also use the user registrar 142 to edit user profile information, such as to change contact information 128 or media preferences 130 associated with the user.

When a new user registers with the system 100 via the user registrar 142, in some examples the system 100 can send an email, text message, or other registration confirmation message to the user to confirm that the user desires to register with the system 100. If the user responds to the registration confirmation message and confirms that the user desires to register with the system 100, the system 100 can activate the corresponding user profile and cause the media content distributor to begin sending notifications about selected media content instances 104 to a user device associated with the user.

In some examples, a Quick Response (QR) code, a barcode, an alphanumeric code, or another type of code associated with the system 100 can cause the user registrar 142 to generate or finalize a user profile based on at least some predefined settings and/or settings selected by another user. As a non-limiting example, if a doctor diagnoses a patient as having a particular type of cancer, the doctor can use the user registrar 142 to pre-register the patient with the system. During pre-registration of the patient, the doctor can select media preferences 130 associated with media content categories 118 that are related to the particular type of cancer with which the patient has been diagnosed. For instance, the doctor can select media content categories 118 associated with the type of cancer, treatment options the doctor is or will be prescribing or recommending to the patient, and/or other information that the doctor thinks may be relevant to the patient's cancer diagnosis or treatment. The user registrar 142 can generate a QR code associated with the doctor-selected media preferences 130 based on the doctor's pre-registration of the patient with the system 100, and the doctor can provide the QR code to the patient. If the patient scans the QR code with a user device, the user device can load a version of the user registrar 142 that allows the patient to enter his or her contact information 128 during registration with the system 100, but that uses media preferences 130 based on media content categories 118 that were already chosen for the patient by the doctor during the pre-registration process. In some examples, the patient can also select his or her own preferred media content categories 118. The patient can accordingly use the user registrar 142 to finalize the patient's registration with the system 100, and the system 100 can begin providing a user device of the patient with notifications of media content instances 104 in the media content categories 118 chosen for the patient by the patient's doctor and/or media content categories 118 chosen by the patient.

The user interface 114, or a different user interface of the system 100, can include a content creation portal 144. The content creation portal 144 can allow content creators 146, such as individuals, groups, companies, or other entities who produce media content instances 104, to create and/or upload media content instances 104 to the system 100. For example, the content creation portal 144 can be a web page that can record audio and video of a new media content instance through a microphone and camera of a computer or other device of a content creator, and can allow the content creator to edit the recorded audio and/or video, add subtitles, add graphics, or otherwise produce the new media content instance. As another example, the content creation portal 144 can be a web page or other interface that allows content creators 146 to upload media content instances 104 produced on other devices to the system 100.

The content creation portal 144 can, in some examples, allow the content creators 146 to specify initial priority ratings 122 of the new media content instances 104. For example, if a content creator provides a new media content instance that the content creator believes is an important practice tip for medical professionals, the content creator may indicate via the content creation portal 144 that the new media content instance should have a relatively high initial priority rating, such that the system 100 will prioritize notifying users with corresponding user profiles 106 about the new media content instance. In other examples, moderators, agents 140, or other representatives associated with the system 100 can review media content instances 104 provided by content creators 146 via the content creation portal 144, and can assign initial priority ratings 122 based on subjective determinations of the importance or usefulness of the media content instances 104. In still other examples, the priority determiner 124 can assign priority ratings 122, such as default priority ratings 122 or other priority ratings 122 determined by the priority determiner 124, to new media content instances 104 provided by content creators 146 via the content creation portal 144.

The content creation portal 144 can allow content creators 146 to specify the media content categories 118 associated with new media content instances 104, or moderators, agents 140, or other representatives associated with the system 100 can select the media content categories 118 associated with new media content instances 104. In some examples, the content creation portal 144 can allow content creators 146 to identify specific users, or specific types or groups of users, that should be notified about new media content instances 104 provided by the content creators 146. For example, a content creator can indicate that a new media content instance is associated with a particular channel in the system 100, and should be distributed to users who are associated with that particular channel, as discussed further below.

In some examples, media content instances 104, users, and/or content creators 146 can be associated with channels in the system 100. Channels can be collections of media content instances 104 from the same content creators 146 or groups of content creators 146. As an example, a user can use the user registrar 142 to indicate media preferences 130 for media content categories 118 associated with one or more channels, or otherwise can subscribe to all or some media content instances 104 associated with one or more channels. As another example, the system 100 can automatically associate a user with a channel based on a user identifier, contact information 128, or other user data that indicates that the user is associated with a content creator, a group of content creators 146, or other entity associated with the channel. Tags or other data associated with individual media content instances 104, media content categories 118, user identifiers 126, and/or media preferences 130 can indicate data associated with particular channels.

As a non-limiting example, a content creator may be a hospital administrator who creates a new video to explain new rules for doctors who work at a particular hospital managed by the hospital administrator. The system 100 can have a channel associated with the particular hospital. For example, the media content instances 104 associated with the channel can be within a media content category associated with the hospital and/or the channel. Users can subscribe to the channel based on their user identifiers 126 being associated with the hospital and/or their media preferences 130 indicating a preference to receive media content instances 104 associated with the hospital and/or the channel.

In this example, the hospital administrator can use the content creation portal 144 to upload a new video to the system 100 in association with a channel for the hospital, and can indicate that users of the system 100 who are doctors associated with the hospital should be notified about the new video. Accordingly, the system 100 can begin sending notifications about the hospital administrator's new video to user devices of doctors associated with the hospital, based on information in corresponding user profiles 106 or other indications indicating that the users are associated with the channel. The system 100 can similarly avoid sending notifications of the hospital administrator's new video to user devices of other types of users, such as users who are not doctors associated with the hospital or are otherwise not associated with the channel, and/or may not permit such other users to access the hospital administrator's new video.

In some examples, the user interface 114 of the system 100 can be themed or branded in association with individual channels. For example, if the notification 108 sent to the user device 110 is about a media content instance in a channel associated with a particular hospital system, and a user selects the media link 112 to access the media content instance via the user interface 114, text, icons, graphics, colors and/or other elements of the user interface 114 can be themed based on the logo or branding of the hospital system.

In some examples, the system 100 can include a behavior analyzer 148. The behavior analyzer 148 can be configured to receive behavior data 150 associated with users from one or more behavior data providers 152, and to determine whether the behavior data 150 indicates that media content instances 104 accessed by users have led to a change in behavior of the users. The behavior analyzer 148 can accordingly help determine whether the substance of media content instances 104 is useful to users of the system 100, as the behavior data 150 may indicate whether educational or training information expressed in media content instances 104 have been put into practice by the users.

As a non-limiting example, the behavior data 150 can be prescription data provided by IQVIA® or other behavior data providers 152 that indicates prescriptions issued to patients by healthcare providers identified by NPIs. As discussed above, the user identifiers 126 of users who are doctors or other healthcare providers can be NPIs. Accordingly, if the media response data 132 indicates that a doctor identified by a particular NPI used the system 100 two months ago to watch a video summarizing results of a pharmaceutical trial for a drug, and the behavior data 150 indicates that the doctor has been prescribing that drug more frequently in the two months since watching the video relative to before the doctor watched the video, the behavior analyzer 148 can determine that the video may have contributed to the doctor prescribing the drug more often.

In some examples, insights about media content instances 104 determined by the behavior analyzer 148 based on the behavior data 150 can be used by the priority determiner 124 to adjust priority ratings 122 of the media content instances 104. For example, if the behavior analyzer 148 determines that a first media content instance is more effective at changing user behavior than a second media content instance, the priority determiner 124 can increase or maintain the priority rating of the first media content instance and lower the priority rating of the second media content instance.

The system 100 can also use behavior data 150, user engagement metrics 120, media response data 132, and/or other information to test alternate versions of a media content instance. For example, content creators 146 can create version of a media content instance that expresses substantially the same information using different narration, different graphics, and/or other different elements. The system 100 can notify different sets of users about different versions of the media content instance. If over time the behavior data 150 indicates that a first version of the media content instance is more effective at changing user behavior than a second version of the media content instance, and/or if user engagement metrics 120 or media response data 132 indicates that users are more likely to engage with the first version than the second version, the system 100 may prioritize sending subsequent notifications to users about the first version over sending notifications about the second version.

In some examples, the system can have a summary generator 154 configured to generate summaries 156 for partners 158 of the system 100. The partners 158 can be companies, organizations, or other entities that are interested in the user engagement metrics 120, behavior analysis determined by the behavior analyzer 148, survey results or user feedback provided by user through the chat interface 138, and/or other data maintained by the system 100. Such information can be compiled into summaries 156 by the summary generator 154, and the system 100 can send the summaries 156 to the partners 158.

As a non-limiting example, one or more media content instances 104 can discuss a drug produced by a pharmaceutical company. In this example, independent content creators 146 unrelated to the pharmaceutical company can produce media content instances 104 that discuss benefits of the drug, side effects of the drug, results of trials or studies associated with the drug, and/or other information about the drug. Although the pharmaceutical company did not produce the media content instances 104 in this example, the pharmaceutical company can be a partner of the system that receives summaries 156 indicating user feedback to the media content instances 104. The summaries 156 can indicate, for instance, verbatim user feedback about the drug provided by users to agents 140 via the chat interface 138, user responses to survey questions or other questions about the drug posed by agents 140 to users via the chat interface 138, pricing concerns or other concerns about the drug indicated by users through the chat interface 138, and/or other information about the drug received from users via the chat interface 138 or other elements of the system 100.

Overall, the system 100 can select media content instances 104 for users based on media preferences 130 associated with the users and priority ratings 122 of the media content instances 104. When the system 100 selects a media content instance for a user, the system 100 can send a notification, such as the notification 108 shown in FIG. 1, to a user device of the user. The notification can inform the user about the selected media content instance, and provide the user with an option to access and consume the selected media content instance. Because different users may have different media preferences 130, the system can send each individual user notifications about media content instances that may be relevant to that particular user. The system 100 can also receive user feedback on the relevance and/or usefulness of the media content instances 104 that users consume, for instance via user engagement metrics 120, media response data 132, the chat interface 138, and/or the behavior analyzer 148. Such user feedback can be used by the priority determiner 124 to adjust the priority ratings 122 of the media content instances 104, such that the system 100 can prioritize sending notifications about the most popular, useful, and/or effective media content instances 104 in the future.

FIG. 2 shows an example 200 of data stored in the system 100 in association with media content instances 104. As discussed above, the system 100 can have a file system, database, or other repository that stores media files and other data associated with the media content instances 104, such as media content instance 104A, media content instance 104B, and media content instance 104C shown in FIG. 2. Media content identifiers 116 such as titles, dates, and/or other data can uniquely identify corresponding media content instances 104.

Individual media content instances 104 can be associated with one or more media content categories 118. For example, the example media content instances 104 shown in FIG. 2 are each associated with a cancer category, but can be associated with other different categories. For instance, in addition to the cancer category, media content instance 104A is also associated with a lung cancer category and a treatment updates category, media content instance 104B is also associated with an Oncology Society Meeting category, and media content instance 104C is also associated with a breast cancer category and a trial results category.

In the example shown in FIG. 2, a first user who indicates media preferences 130 for the cancer category may be notified by the system 100 about media content instance 104A, media content instance 104B, and media content instance 104C, because all three of those media content instances 104 are associated with the cancer category. However, if a second user indicates media preferences 130 for the breast cancer category specifically, and not the broader cancer category, the system 100 may notify the second user about media content instance 104C and not media content instance 104A or media content instance 104B, because only media content instance 104C is associated with the breast cancer category preferred by the second user in the example shown in FIG. 2. Similarly, if a third user indicates media preferences 130 for the treatment updates category and the trial results category, the system 100 may notify the third user about media content instance 104A and media content instance 104C, and not notify the third user about media content instance 104B.

As discussed above, the system 100 can be configured to notify users about media content instances 104 based on media preferences 130 of the users and priority ratings 122 of the media content instances 104. For instance, the media content distributor 102 can be configured to select a media content instance for a user that, based on media preferences 130 associated with the user, is within media content categories 118 preferred by the user. If multiple media content instances 104 are in those preferred media content categories 118, the media content distributor 102 can select the media content instance with the highest priority rating that the system 100 has not yet notified the user about, and can send a corresponding notification to a user device of the user.

As a non-limiting example, if the first user discussed above has indicated media preferences 130 for the cancer category, the media content distributor 102 can determine that media content instance 104A, media content instance 104B, and media content instance 104C are each candidates to be selected for the first user. If the system 100 has not yet notified the first user about any of media content instance 104A, media content instance 104B, or media content instance 104C, the media content distributor 102 can select media content instance 104A for the first user, because media content instance 104A has the highest priority rating of the candidates. The media content distributor 102 can accordingly cause the system 100 to transmit a notification, with a media link to the media content instance 104A, to a user device of the first user. At a later point in time, after the system 100 has notified the first user about media content instance 104A, the media content distributor 102 may select media content instance 104B for the first user, because media content instance 104B has the highest priority rating of the remaining candidates that have media content categories 118 corresponding to the media preferences 130 of the first user.

FIG. 3 shows an example 300 of the notification 108 sent by the system 100 to the user device 110. As discussed above, in some examples the notification 108 can be an SMS message or other type of text message that the system 100 sends to a telephone number or other identifier associated with the user device 110. The user device 110 can present the notification 108 via a messaging application 302, such as a default or user-selected messaging application. For example, the messaging application 302 can be a part of the operating system of the user device 110, a native or default text messaging application associated with the user device 110, or a third-party application that the user has downloaded and installed on the user device 110. In other examples, the messaging application 302 can be associated with the system 100, such as downloadable application provided by the operator of the system 100.

As discussed above, the notification 108 can be associated with a particular media content instance selected by the system 100 for a user, based on media preferences 130 of the user and priority ratings 122 of the media content instances 104. The media link 112 in the notification 108 can be a user-selectable link that, if selected by the user, allows the user device 110 to access and present the particular media content instance via the user interface 114 of the system 100. The notification content 134 in the notification 108 can include an introduction, title, description, and/or other content associated with the particular media content instance.

In some examples, the media link 112 can be a hyperlinked image associated with the corresponding media content instance, such as a title card, screenshot, or thumbnail image. The image can show a play button or other indication that, if the user selects the media link 112 in the notification 108, the user can view the corresponding media content instance. In other examples, the media link 112 can be a text link, such as hyperlinked text or a uniform resource locator (URL), associated with the corresponding media content instance.

The media link 112 can be a hyperlink to the corresponding media content instance. Accordingly, if the user selects the media link 112 in the notification 108, for instance by tapping the media link 112 on a touchscreen of the user device 110, the user device 110 can access the linked media content instance by loading and displaying the user interface 114. The user interface 114 can include the media player 136, which can present the corresponding media content instance. As discussed above, the user interface 114 can be a web page or website, such that the user device 110 can open a default or user-selected web browser to access the media content instance through the web page or website of the user interface 114.

As a non-limiting example, a user may receive the notification 108 shown in FIG. 1 via the messaging application 302 on the user device 110 of the user. The user can view the notification 108, including the media link 112 and the notification content 134 associated with the media content instance selected for the user by the system 100. If the user chooses to consume the media content instance, the user can select the media link 112. The user selection of the media link 112 can cause the user device 110 to load the user interface 114 of the system 100 via a web browser or other application executing on the user device 110, through which the user can view or otherwise consume the media content instance associated with the notification 108.

Figure 4:
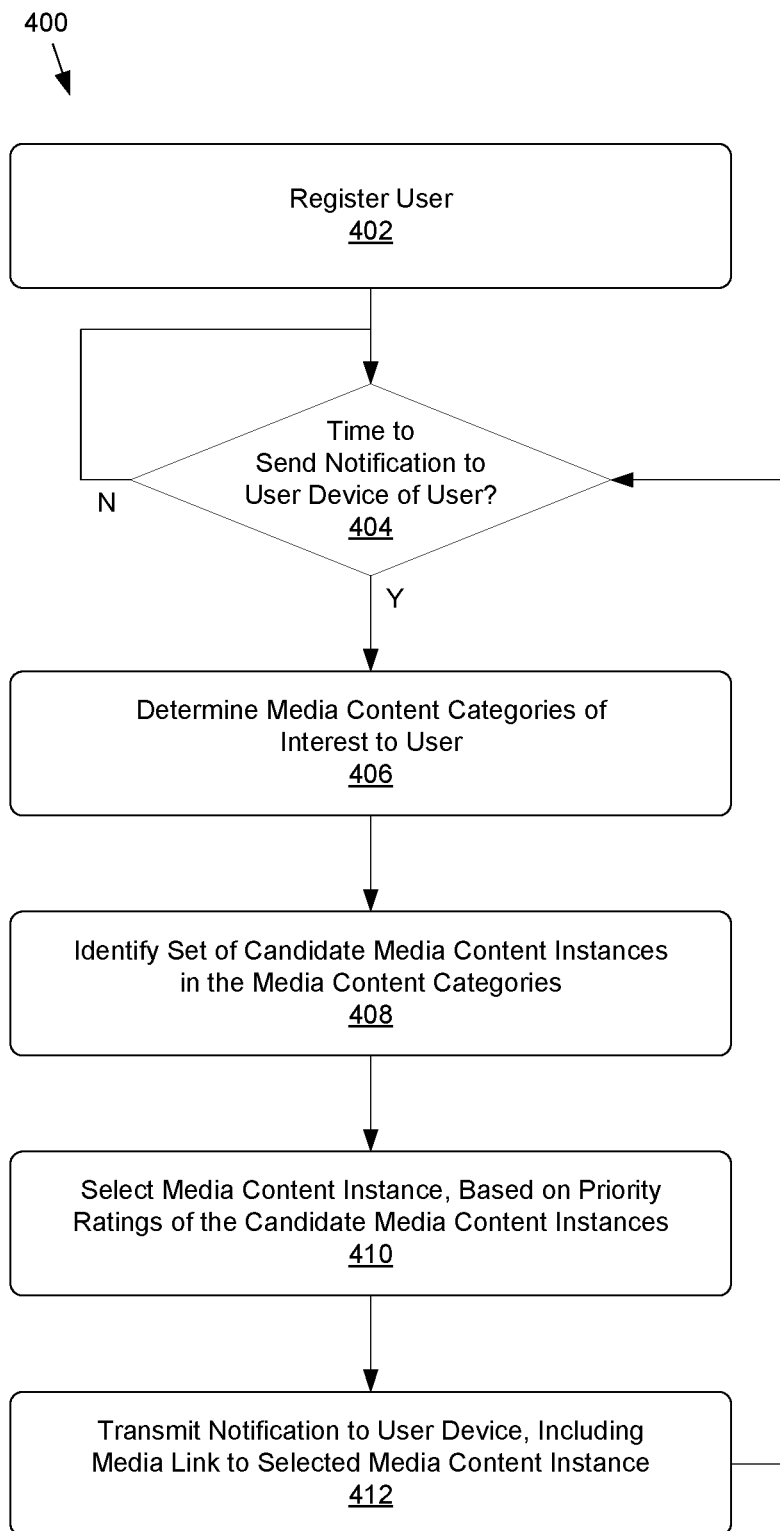
FIG. 4 shows a flowchart of an example process for transmitting a notification to a user device to notify a user about a selected media content instance.

FIG. 4 shows a flowchart of an example process 400 for transmitting a notification to a user device to notify a user about a selected media content instance. The user can be associated with the user device 110 shown in FIG. 1. Process 400 can be implemented by one or more elements of the system 100 executing on one or more computing devices. An example system architecture for such a computing device is described below with respect to FIG. 5.

At block 402, the system 100 can register the user. For example, the user can access the user registrar 142 via the user interface 114 of the system 100, and use the user registrar 142 to provide information that the system 100 uses to generate a user profile associated with the user. For instance, the user can provide a name, username, NPI, and/or other identifiers associated with the user, which the system 100 can store as one or more user identifiers 126 for the user. In some examples, the system 100 can also, or alternately, generate an internal user identifier for the user, such as a user identification number. The user can also provide contact information 128, including a telephone number, email address, or other identifier or address the system 100 can use to send notifications to the user device 110 of the user. In some examples, the user can further indicate media preferences 130, such as one or more media content categories 118 that are of interest to the user, and/or selections of subscriptions to one or more channels of media content instances 104. In other examples, the media preferences 130 associated with the user can be pre-selected for the user during a pre-registration process performed by a different user. After receiving user information via the user registrar 142, the system 100 can generate, finalize, and/or store a corresponding user profile for the user and complete registration of the user with the system 100.

Based on the user's registration with the system 100, the system 100 can be configured to send a series of notifications to the user device 110 of the user over time. Accordingly, the system 100 can determine at block 404 whether a notification is to be sent to the user device 110 at the current day and time. The system 100 can determine whether a notification is to be sent to the user device 110 based on a notification schedule and/or a period of time since a preceding notification was sent to the user device. For example, the notification schedule can indicate that notifications are to be sent to the user device 110 once per day, once per week, once per month, on certain days of the week, after a certain duration following the last transmission of a notification to the user device 110, and/or based on any other schedule.

The notification schedule can be indicated by the media preferences 130 associated with the user. In some examples, the notification schedule can be selected by the user, for instance during registration of the user at block 402. In other examples, the system 100 can automatically determine or adjust the notification schedule associated with the user over time, for instance based on media response data 132 that indicates how frequently the user accesses media content instances 104 in response to notifications, how quickly the user accesses media content instances 104 after the system 100 sends notifications, times of day the user accesses media content instances 104 via notifications, and/or other factors. For example, if over time the media response data 132 indicates that the user more commonly accesses media content instances in the evening than in the morning, the system 100 can determine or adjust the notification schedule associated with the user to indicate that the system 100 is to send notifications to the user device 110 during evening hours. As another example, the system 100 can initially default to sending notifications to the user device 110 once a week, or based on another default schedule. However, if media response data 132 indicates that the user routinely accesses media content instances 104 in response to notifications within a threshold period time after the notifications have been sent, the system 100 can adjust the notification schedule to send subsequent notifications to the user device 110 more frequently than the default schedule.

If the system 100 determines at block 404 that the current day and time is not a time to send a notification to the user device 110, the system 100 can wait until the next day and/or time at which a notification is to be sent to the user device 110. If the system 100 determines at block 404 that the current day and time is a time to send a notification to the user device 110, the system 100 can move to block 406.

At block 406, the system 100 can determine one or more media content categories 118 that are of interest to the user. For example, the system 100 can use the media preferences 130 in the user profile of the user to identify media content categories 118 selected by the user, media content categories 118 selected for the user by another user during a pre-registration process, channels the user has subscribed to, and/or other indications of the media content categories 118 of interest to the user.

At block 408, the system 100 can identify a set of candidate media content instances 104 within the one or more media content categories 118 determined at block 406. The candidate media content instances 104 can be media content instances 104 that the system 100 has not yet notified the user about. For example, if the system 100 has previously sent a notification to the user device 110 about a particular media content instance, the system 100 may not identify that particular media content instance as a candidate media content instance at block 408. However, if the one or more media content categories 118 determined at block 406 contain other media content instances 104 that the system 100 has not yet sent notifications about to the user device 110, the system 100 can identify those media content instances 104 as candidate media content instances 104 at block 408.

At block 410, the system 100 can select a media content instance, from the set of candidate media content instances 104 identified at block 408, based on the priority ratings 122 of the candidate media content instances 104. For example, the system 100 can be configured to select the media content instance that has the highest priority level of the candidate media content instances 104.

At block 412, the system 100 can transmit a notification, such as the notification 108 shown in FIG. 1 and FIG. 3, to the user device 110. The notification can include a media link to the media content instance selected for the user by the system 100 at block 410. In some examples, the notification can be an SMS message, or other type of text message, sent by the system 100 to a telephone number of the user device 110 indicated in the user profile of the user. If the user selects the media link in the notification, the user device 110 can use the media link to load the user interface 114 of the system 100 in a web browser or other application, such that the user can consume the media content instance associated with the media link via the user interface 114.

After transmitting a notification of a selected media content instance to the user device 110 at block 412, the system 100 can return to block 404 and wait until the next day and time at which, based on a notification schedule associated with the user, a notification is to be sent to the user device 110. At the next day and time at which a notification is to be sent to the user device 110, the system 100 can use media preferences 130 at block 406 to determine media content categories 118 that are of interest to the user. In some examples, the user may have changed his or her use media preferences 130 since the system 100 sent the last notification to the user device 110. At block 408, the system 100 can also identify a new set of candidate media content instances 104 in the media content categories 118 that are of interest to the user. The new set of candidate media content instances 104 can be a different set of media instances than in the previous loop through block 408. For instance, the media content instance associated with the last notification sent to the user device 110 can be omitted from the new set of candidate media content instances 104. In some situations, new media content instances 104 may have been added to the system since the last notification was sent to the user device 110, and one or more of those new media content instances 104 may be part of the new set of candidate media content instances 104 if the new media content instances 104 are in the media content categories 118 that are of interest to the user. The system 100 can accordingly select a media content instance from the new set of candidate media content instances 104 at block 410, based on the priority ratings 122 of the candidate media content instances 104. In some examples, the priority ratings 122 of one or more of the candidate media content instances 104 may have changed since the last notification was sent to the user device 110. The system 100 can transmit a new notification of the newly-selected media content instance at block 412, and then loop back to repeat blocks 404 through 412.

The system 100 can execute process 400 for multiple users concurrently. For example, while the system 100 may be waiting at block 404 for a date and time to send a notification to a user device of a first user, the system 100 may have determined that it is time to send a notification is to be sent to a user device of a second user. Accordingly, the system 100 can send notifications to user devices of different users at different times based on different notification schedules associated with the different users. The system 100 can also use different media preferences 130 of the different users, and/or different histories of media content instances 104 associated with notifications previously sent to the different users, to select the media content instances 104 associated with the notifications sent to the user devices of the different users.

Figure 5:
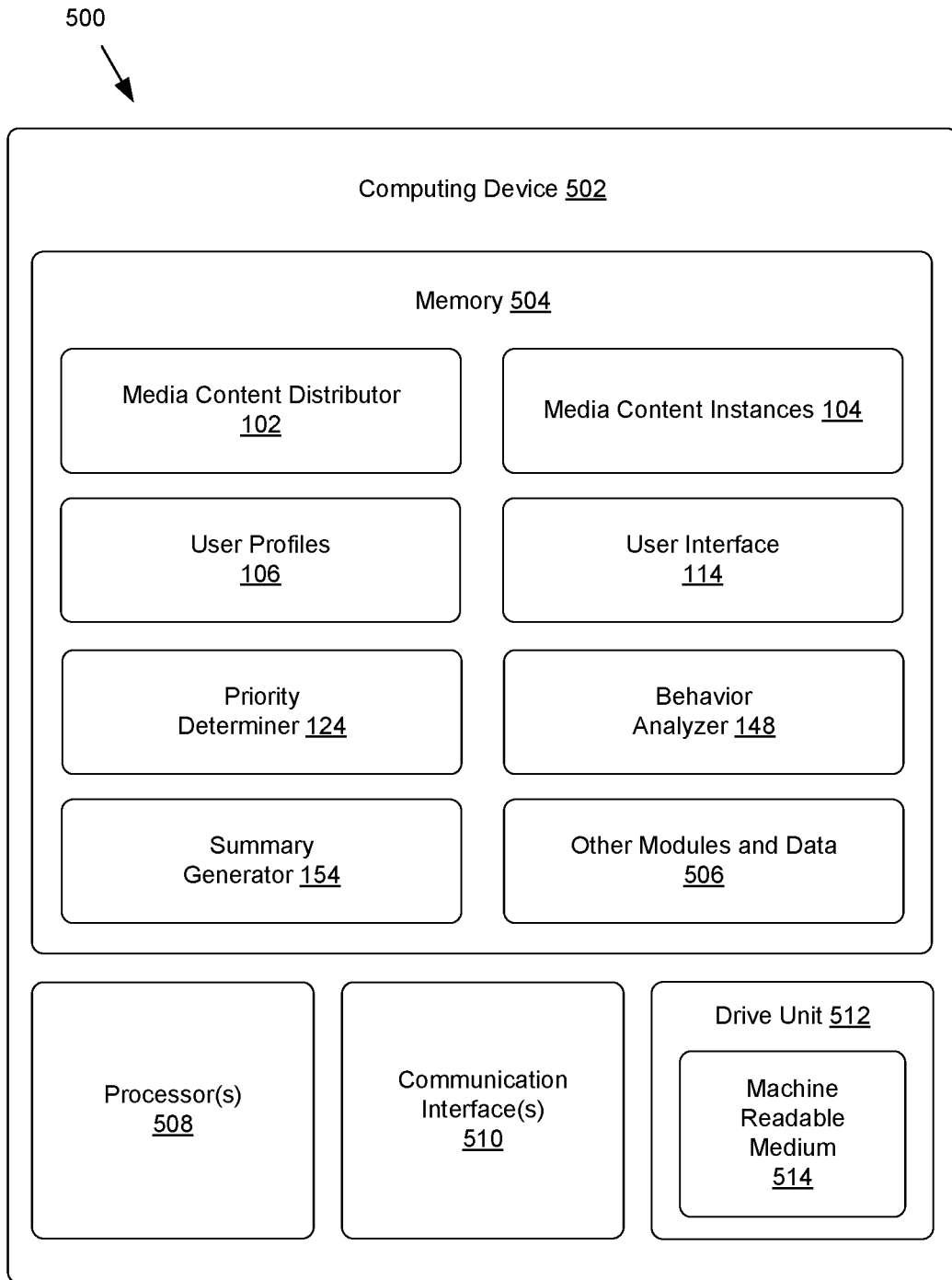
FIG. 5 shows an example system architecture for a computing device associated with the system.

FIG. 5 shows an example system architecture 500 for a computing device 502 associated with the system 100 described herein. The computing device 502 can be a server, computer, or other type of computing device that executes one or more portions of the system 100. In some examples, elements of the system 100 can be distributed among, and/or be executed by, multiple computing devices. For instance, in some examples, the media content distributor 102 can be executed by a first computing device, while the behavior analyzer 148 and/or the summary generator 154 can be executed by a second computing device.

The computing device 502 can include memory 504. In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 502. Any such non-transitory computer-readable media may be part of the computing device 502.

The memory 504 can store computer-executable instructions and other data associated with the system 100. For example, the memory 504 can store computer-executable instructions and other data associated with the media content distributor 102, the media content instances 104, the user profiles 106, the user interface 114, the priority determiner 124, the behavior analyzer 148, and/or the summary generator 154 described above. The memory 504 can also store other modules and data 506. The other modules and data 506 can be utilized by the computing device 502 to perform or enable performing any action taken by the computing device 502. For example, the other modules and data 506 can include a platform, operating system, and/or applications, as well as data utilized by the platform, operating system, and/or applications.

The computing device 502 can have processor(s) 508. In various examples, the processor(s) 508 can be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which can be associated with common types of volatile (RAM) and/or nonvolatile (ROM) memory.

The computing device 502 can also have communication interfaces 510. The communication interfaces 510 can include transceivers, modems, network interfaces, antennas, wireless communication interfaces, and/or other components that can transmit and/or receive data over networks or other data connections. In some examples, some of the communication interfaces 510 can be associated with cellular networks or other telecommunication networks, such that the computing device 502 can send notifications about media content instances 104 to user devices as SMS messages or other text messages via the telecommunication networks. Some of the communication interfaces 510 can be associated with Internet connections or other data connections, such that the computing device 502 can serve website data and/or other data associated with the user interface 114 to user devices.

The computing device 502 can additionally have a drive unit 512 including a machine readable medium 514. The machine readable medium 514 can store one or more sets of instructions, such as software or firmware, that embodies any one or more of the methodologies or functions described herein. The instructions can also reside, completely or at least partially, within the memory 504, processor(s) 508, and/or communication interface(s) 510 during execution thereof by the computing device 502. The memory 504 and the processor(s) 508 also can constitute machine readable media 514.

In some examples, the computing devices 502 can also have other elements, such as displays, output devices, and/or input devices. A display can be a liquid crystal display, or any other type of display commonly used in computing devices. For example, a display may be a touch-sensitive display screen, and can then also act as an input device or keypad, such as for providing a soft-key keyboard, navigation buttons, or any other type of input. The output devices can include any sort of output devices known in the art, such as a display, speakers, a vibrating mechanism, and/or a tactile feedback mechanism. Output devices can also include ports for one or more peripheral devices, such as headphones, peripheral speakers, and/or a peripheral display. The input devices can include any sort of input devices known in the art. For example, input devices can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
  receiving, by the one or more processors, first behavior data;

determining, by one or more processors, that a notification associated with a media content instance is to be sent to a user device, based on a notification schedule associated with the user device;

transmitting, by the one or more processors, the notification to the user device, wherein the notification is configured to present the media content instance;

receiving, by the one or more processors, second behavior data, the second behavior data associated with a period of time following the transmitting of the notification; and determining, by the one or more processors and based at least in part on the first behavior data and the second behavior data, a metric associated with a user.

2. The method of claim 1, further comprising:

determining, by the one or more processors, one or more media content categories relevant to the user, based on media preferences indicated by a user profile associated with the user;

identifying, by the one or more processors, one or more candidate media content instances, in the one or more media content categories, that are not associated with notifications previously sent to the user device;

selecting, by the one or more processors, the media content instance from among the one or more candidate media content instances, based on priority ratings associated with the one or more candidate media content instances prior to transmitting the notification to the user device.

3. The method of claim 2, wherein the priority rating is specified by a creator of the media content.

4. The method of claim 2, wherein determining the one or more media content categories relevant to the user is based at least in part on a content category specified by a creator of the media content.

5. The method of claim 1, further comprising:

determining, by the one or more processors, that the user accessed the media content instance via the user interface; and wherein determining the differences in behavior of the user is in response to the user accessing the media content instance.

6. The method of claim 1, wherein the user is a healthcare provider and the first behavior data and the second behavior data is prescription information associated with prescriptions issued by the healthcare provider for at least one patient before and after the healthcare provider accessed the media content instance.

7. The method of claim 1, further comprising:

receiving, by the one or more processors, user feedback to the media content instance;

aggregating, by the one or more processors, the user feedback to the media content instance with feedback of the media content instance from additional users; and providing, by the one or more processors, the summary to a partner entity.

8. The method of claim 1, wherein:

the first behavior data is associated with a user;

the user device is associated with the user; and the second behavior data is associated with the user and a period of time following the transmitting of the notification.

9. One or more non-transitory computer-readable media storing computer-executable instructions that, when executed by one or more processors, cause the one or more processors to perform operations comprising:

transmitting a notification to one or more user devices, wherein the notification comprises a media link configured to present the media content instance;

receiving behavior data, the behavior data associated with a period of time following the transmitting of the notification; and determining, based at least in part on the behavior data, a metric associated with the period of time.

10. The one or more non-transitory computer-readable media of claim 9, wherein the metric is associated with a change of behavior of a user of the user device and is based at least in part on prior behavior data associated with the user and a second period of time prior to transmitting of the notification.

11. The one or more non-transitory computer-readable media of claim 9, wherein the metric is a user engagement metric.

12. The one or more non-transitory computer-readable media of claim 9, wherein the operations further comprise determining a second media content instance is to be sent to the user device based on at least in part on the metric.

13. The one or more non-transitory computer-readable media of claim 9, wherein:

the behavior data is associated with two or more users that have consumed the media content instance; and the metric includes an aggregation of behavior data associated with the two or more users.

14. A system comprising:

one or more processors; and one or more non-transitory computer-readable media storing computer-executable instructions that, when executed by one or more processors, cause the one or more processors to perform operations comprising:

receiving, by the one or more processors, first behavior data;

determining, by one or more processors, that a notification associated with a media content instance is to be sent to a user device, based on a notification schedule associated with the user device;

transmitting, by the one or more processors, the notification to the user device, wherein the notification is configured to present the media content instance;

receiving, by the one or more processors, second behavior data, the second behavior data associated with a period of time following the transmitting of the notification; and determining, by the one or more processors and based at least in part on the first behavior data and the second behavior data, a metric associated with a user.

15. The system of claim 14, wherein the operations further comprise:

determining, by the one or more processors, one or more media content categories relevant to the user, based on media preferences indicated by a user profile associated with the user;

identifying, by the one or more processors, one or more candidate media content instances, in the one or more media content categories, that are not associated with notifications previously sent to the user device;

selecting, by the one or more processors, the media content instance from among the one or more candidate media content instances, based on priority ratings associated with the one or more candidate media content instances prior to transmitting the notification to the user device.

16. The system of claim 15, wherein the priority rating is specified by a creator of the media content.

17. The system of claim 15, wherein determining the one or more media content categories relevant to the user is based at least in part on a content category specified by a creator of the media content.

18. The system of claim 14, wherein the operations further comprise:
   determining, by the one or more processors, that the user accessed the media content instance via the user interface; and
   wherein determining the differences in behavior of the user is in response to the user accessing the media content instance.

19. The system of claim 14, wherein the user is a healthcare provider and the first behavior data and the second behavior data is prescription information associated with prescriptions issued by the healthcare provider for at least one patient before and after the healthcare provider accessed the media content instance.

20. The system of claim 14, wherein the operations further comprise:
   receiving, by the one or more processors, user feedback to the media content instance;
   aggregating, by the one or more processors, the user feedback to the media content instance with feedback of the media content instance from additional users; and
   providing, by the one or more processors, the summary to a partner entity.

* * * * *